S. J. BERNHEIMER.
MOTOR TRUCK.
APPLICATION FILED JUNE 12, 1913.
1,119,225.
Patented Dec. 1, 1914.
3 SHEETS—SHEET 1.
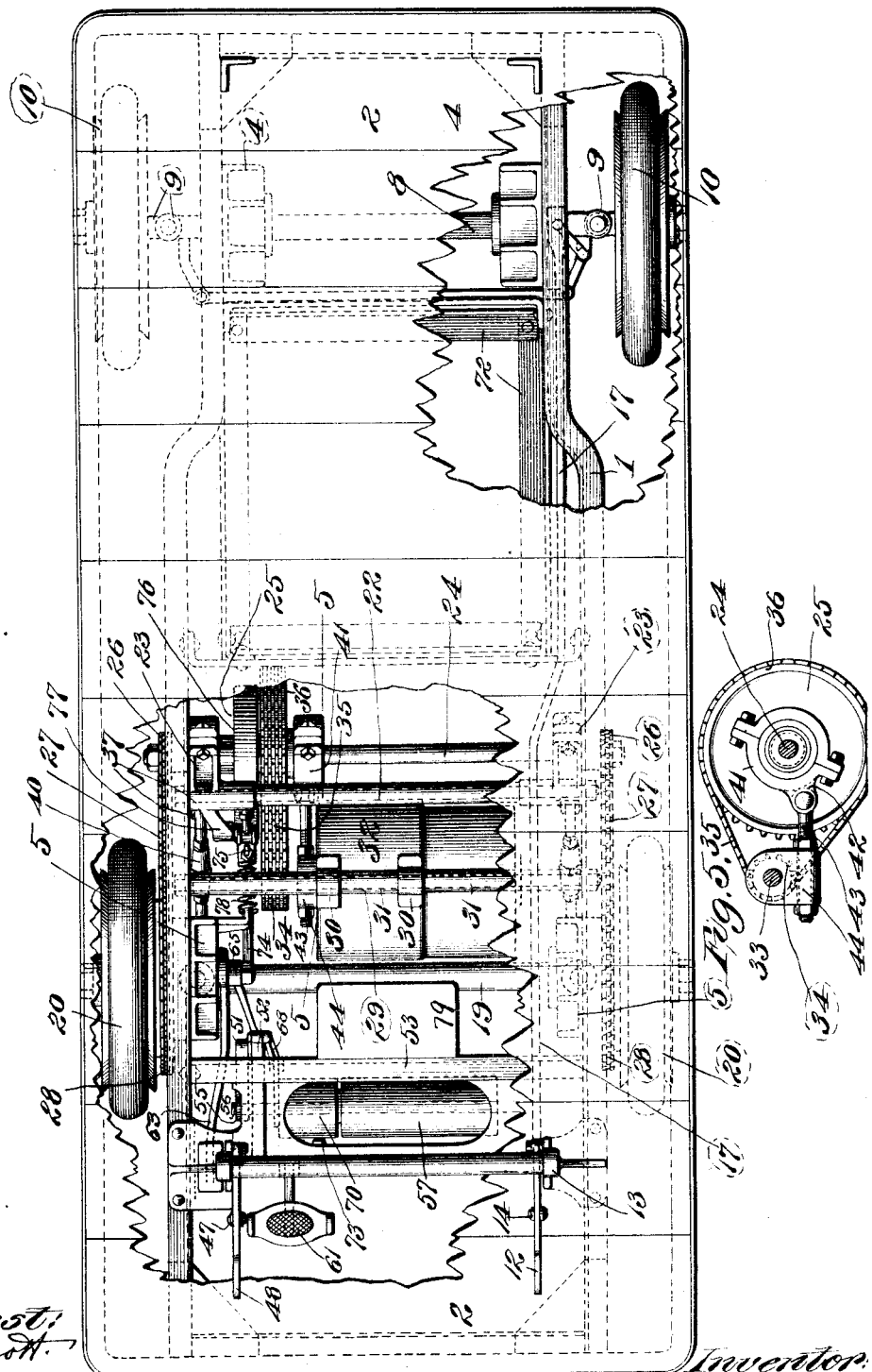

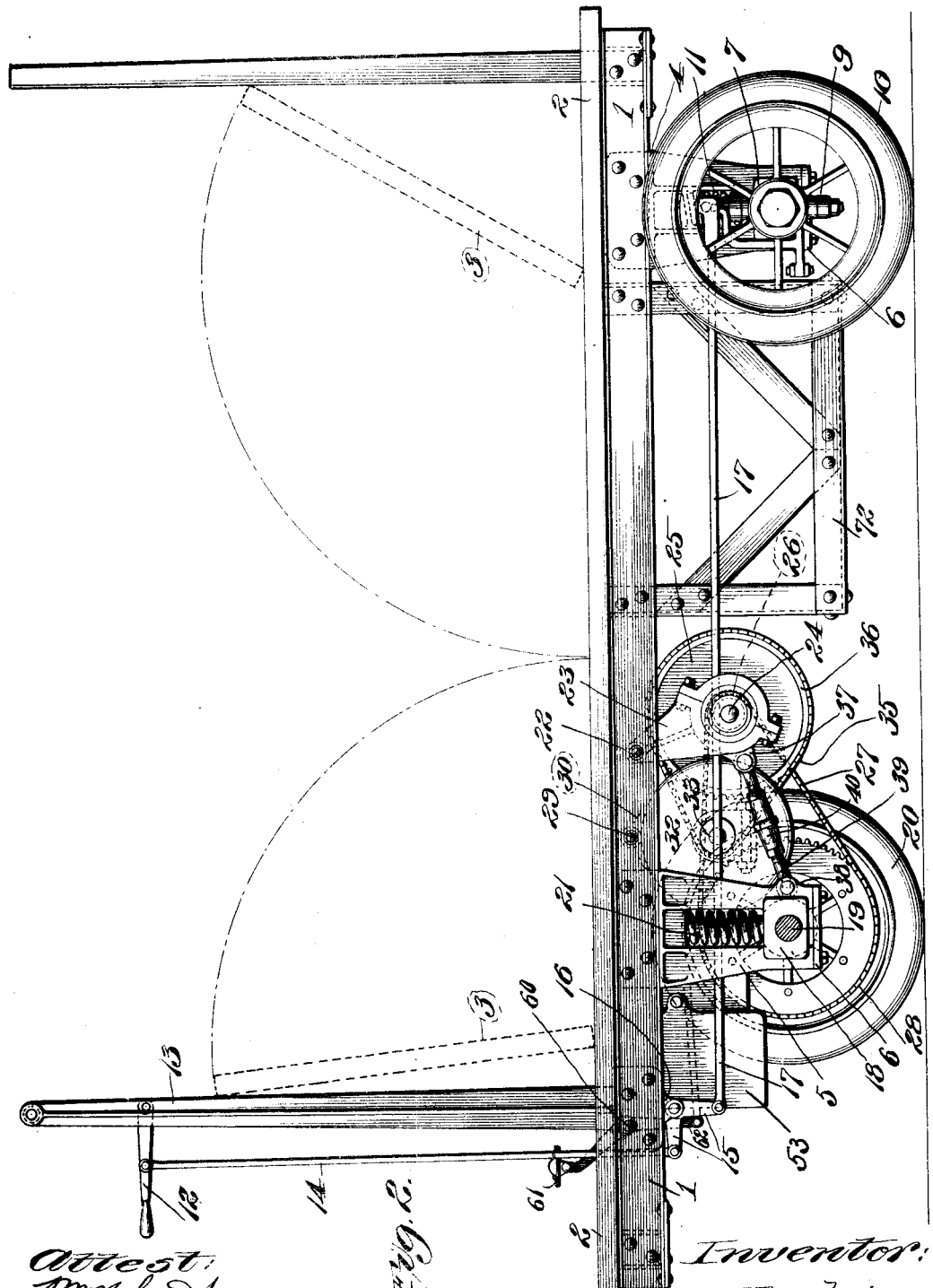

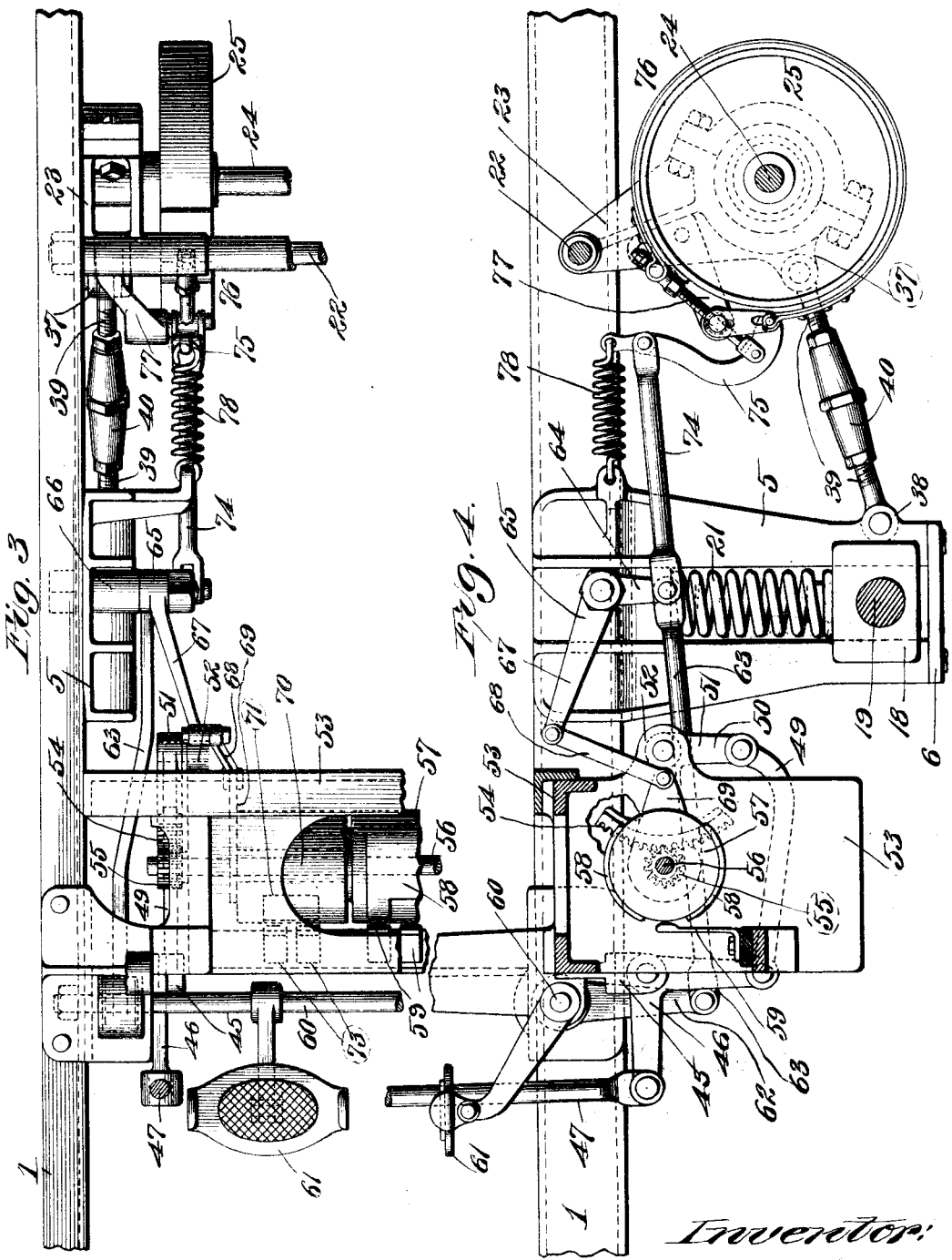

UNITED STATES PATENT OFFICE.

SANFORD J. BERNHEIMER, OF ST. LOUIS, MISSOURI, ASSIGNOR TO THE ELECTROMOBILE COMPANY, OF ST. LOUIS, MISSOURI, A CORPORATION OF DELAWARE.

MOTOR-TRUCK.

1,119,225.  Specification of Letters Patent.  Patented Dec. 1, 1914.

Application filed June 12, 1913. Serial No. 773,366.

*To all whom it may concern:*

Be it known that I, SANFORD J. BERN-HEIMER, a citizen of the United States, residing at the city of St. Louis, State of Missouri, have invented certain new and useful Improvements in Motor-Trucks, of which the following is a specification.

This invention relates generally to motor trucks and, more particularly, to certain new and useful improvements in that class of motor trucks known commercially as industrial or baggage trucks, the objects of my present invention being to provide a truck of the kind stated with a simple, efficient, compactly arranged, and readily assembled chain-driving mechanism; to provide a truck of the kind stated with a chain-driving mechanism in which the motor and driving-shaft, while independently and separately swingable beneath the body-frame, are adjustably maintained in proper operative or driving relation one to the other; to provide a truck of the kind stated having a body-frame resiliently supported on, and capable of yielding vertically relatively to, the rear axle with a chain-driving mechanism in which the driving shaft, while swingably hung from, and beneath, the body-frame, is adjustably maintained in proper operative or driving relation to the driving wheels journaled on said axle; and to improve generally upon trucks of the class described.

With the above and other objects in view, my present invention resides in certain novel features of construction, arrangement, and combination of parts, all as will hereinafter be described and afterward pointed out in the claims.

In the accompanying drawings forming a part hereof, Figure 1 is a plan view of a motor truck embodying my invention, the platform thereof being partly broken away to show the running gear and steering and brake mechanism; Fig. 2 is a side elevational view of my new motor truck, the rear wheel on the near side being removed; Fig. 3 is a detail plan view, somewhat enlarged, of a portion of my new motor truck with the platform removed; Fig. 4 is a side elevational view, also somewhat enlarged, of a portion of my new motor truck, the platform being removed and parts being shown in section; and Fig. 5 is a detail sectional view on the line 5—5, Fig. 1.

Referring now to said drawings, in which like reference numerals refer to like parts throughout the several views, 1 indicates the body-frame, which is, as is usual, formed of suitable channel side and end members riveted or otherwise fixed together at their ends and having their flanges presented outwardly. Fixed upon body-frame 1 is a platform 2 comprising a pair of hinged doors 3—3 opening upwardly, as shown particularly in dotted lines in Fig. 2.

Suitably riveted or otherwise fixed to the side members of body-frame 1 are pairs of rigid longitudinally slotted front and rear axle pedestal-members 4—4 and 5—5, respectively, each of said pedestals being provided with a removable end or cross-piece 6 forming one of the walls of the slot therein, as shown particularly in Figs. 2 and 4.

Arranged in the slots of front pedestals 4—4 are suitable squared portions 7—7 integrally forming part of a non-rotatable axle 8 provided at its ends with suitable steering heads having pivotally connected thereto suitable steering knuckles-and-axles 9—9 having journaled for rotation thereupon suitable front or steering wheels 10—10. Interposed in pedestals 4—4 above and upon squared portions 7—7 are suitable coiled or helical springs 11—11, whereby, as will be clear, body-frame 1 is resiliently supported upon, and permitted to yield or resiliently move vertically relatively to, wheels 10—10 to take up any jars or shocks to which said wheels may be subjected in the operation or running of my new truck.

To steer front wheels 10—10, the steering knuckles-and-axles 9—9 of which are, as is usual, suitably pivotally connected together, so as to move in unison, I provide a suitable hand-lever 12 pivoted at one end to an upstanding member 13 fixed on body-frame 1 adjacent the rear and preferably at the right-hand side thereof. At a suitable point between its ends, lever 12 has pivotal engagement through a rod 14 with one arm of a bell-crank lever 15 pivotally supported on a suitable bracket 16 fixed preferably to upright 13. Pivotally connected at its rear end to the other arm of bell-crank lever 15 and projecting forwardly under body-frame 1 is a rod 17 having a ball-and-socket connection at its forward end with one of said knuckles 9, whereby, as will be obvious, through the pivotal movements of lever 12, of a turn-buckle or sleeve 40. By means of distance rods 39 and their adjusting members 40, it will be obvious that driving or jack-shaft 24 will be maintained in proper operative position relatively to driving-wheels 20—20 and that the position of driving or jack-shaft 24 relatively to driving-wheels 20—20 may be swingably altered or changed and the tension of driving-chains 27—27 correspondingly adjusted, and, further, that one of said distance-rods 39 may be, if necessary or required in the operation of the truck, separately adjusted without necessitating the adjustment of the other, shaft 24 being journaled on hangers 23 in self-alining ball-bearings common on the market today.

Journaled on driving or jack-shaft 24 on a separate self-alining ball-bearing, intermediate hangers, 23—23, is a suitable two-piece or split collar 41 having a rearwardly extending lug or portion 42, in which is pivoted one end of a short bar or rod 43 adjustably fitting at its other end in a bored member 44 fixed on the hub of motor 32, the bore of member 44 having a diameter somewhat larger than the diameter of bar or rod 43. By means of adjustable bar or rod 43, motor 32 and differential 25 are maintained in proper operative position relatively to each other and also motor 32 is capable of a limited swingable adjustment on bar 29 relatively to driving-shaft 24, whereby, on motor 32 being swung or adjusted on bar 29 relatively to shaft 24 and its differential 25, the tension of differential driving-chain 35 may be readily adjusted. It will be clear that an adjustment of the tension of differential driving chain 35 may be made separately and independently of any adjustment of outer or wheel-driving-chains 27, and that correspondingly the tension of outer or wheel-driving chains 27 may be adjusted by the means hereinbefore described independently and separately from any adjustment of the tension of differential driving chain 35, an adjustment of the tension of differential driving chain 35 in no way necessitating or requiring adjustment of the tension of wheel driving chains 27 and correspondingly an adjustment of the tension of wheel driving-chains 27 in no way necessitating or requiring adjustment of the tension of differential driving chain 35. It will be seen that the flexibility of rear axle 19 and driving wheels 20—20 is in no way retarded or affected by distance rods 39—39, and that the foregoing parts of the driving mechanism are compactly arranged beneath body-frame 1 and may be easily repaired or renewed whenever necessary.

Suitably pivoted on a bracket or the like 45 fixed to body-frame 1 adjacent the rear end and at the left-hand side thereof is a bell-crank lever 46, to one arm of which is pivoted at its lower end an upstanding operating rod 47 pivotally connected at its upper end to an operating handle 48 substantially identical with steering-lever 12 and likewise pivotally connected at one end to an upstanding member, not shown, fixed on body-frame 1 and similar to said upright 13. Pivotally connected at its rear end to the other arm of bell-crank lever 46 is a forwardly presented link 49 preferably curved upwardly at its forward end and there pivotally connected to an arm 50 of a bell-crank lever 51 pivotally mounted on an arm or bracket 52 fixed to a controller frame 53 fixed to and supported by body-frame 1. The other arm 54 of bell-crank lever 51 is substantially in the form of a segmental spur-gear or sector which meshes with a gear 55 fixed on a shaft 56 mounted in suitable bearings in controller frame 53 and having fixed thereto within controller frame 53 a cylinder 57 provided on its periphery with a plurality of starting and speed contact members 58 adapted to contact, on the rotation of cylinder 57, with a plurality of fixed starting and speed contact members 59 suitably mounted on controller frame 53 and having suitable electrical connection through a rheostat 79 with motor 32.

Extending transversely of body-frame 1 adjacent the rear end, and journaled in suitable bearings on the side members, thereof, is a shaft 60 having fixed thereto a suitable foot lever 61. Fixed at one end to shaft 60 and depending therefrom is an arm or lever 62 pivotally connected at its lower end to the rear end of a forwardly presented link or rod 63 pivotally connected at its forward end to an arm 64 of a bell-crank lever 65 pivotally mounted on a suitable bracket 66 fixed to body-frame 1. The other arm 67 of bell-crank lever 65 is pivotally connected by means of a connecting link 68 with a member 69 fixed to a cylinder 70 loose on shaft 56 and provided on its periphery with a switch contact member 71 adapted, on the rotation of cylinder 70, to electrically contact with fixed switch contact members 73—73 suitably mounted on controller frame 53, one of said contact members 73 having suitable electrical connection with a storage battery or other source of electrical energy (not shown) carried by a skeleton cradle 72 fixed to and carried by body-frame 1, as shown particularly in Fig. 2, and the other of said contact-members 73 being in electrical circuit with said speed and controller contact members 59.

Pivotally connected at its rear end to arm 64 of bell crank lever 65 is a link or rod 74 pivotally connected at its forward end to a brake-cam 75 operatively connected to a suitable band brake mechanism 76 operating upon the drum of differential 25 and having suitable pivoted connection with an arm or bracket 77 fixed to hanger 23, as shown particularly in Fig. 4. Having one end connected or attached to brake cam 75 and its other end to adjacent rear pedestal 5 or other fixed point on body-frame 1, as shown in Fig. 4, is a coiled spring 78.

Normally spring 78 is adapted to maintain brake mechanism 76 in braking engagement with the drum of differential 25; normally also the circuit to storage battery or other source of electrical energy carried by the truck is broken, operating handle 48 on rod 47 being in substantially horizontal position relatively to the plane of body-frame 1 and foot-lever 61 being in uppermost position, or in the position thereof as shown particularly in Figs. 2 and 4. To start the truck, foot-lever 61 is depressed by the operator, whereupon through arm 62, link 63, bell-crank lever 65, link 68, and member 69, switch-cylinder 70 will be rotated on shaft 56 and switch contact member 71 brought into electrical engagement with fixed switch contact members 73, the circuit from said storage battery being thereby completed to controller-cylinder 57; at the same time, through link 74, brake-cam 75 will be pivotally moved against the tension of spring 78 and braking mechanism 76 thereby released from braking engagement with the drum of differential 25, driving-shaft 24 and its differential 25 being then free to rotate. Now, through said operating handle 48, rod 47 is pivotally moved upwardly or downwardly, depending upon whether it be desired the truck go forward or backward, to rotate cylinder 57 to bring movable speed and controlling contact members 58 into electrical engagement with fixed speed or controlling contact members 59 and thereby complete the circuit to motor 32, this movement of cylinder 57 being accomplished through bell crank 46, link 49, arm 50, and the meshing engagement of segmental spur-gear 54 with said gear 55 fixed on shaft 56.

To stop the truck, the operator's foot need only be removed from foot-lever 61, whereupon through spring 78, braking mechanism 76 will be at once thrown into braking engagement with the drum of differential 25 and cylinder 70 at the same time reversely actuated, electrical connection with said storage battery being thereby broken; afterward said operating lever 48 is brought to normal position and speed and contact members 58 and 59 thereby thrown out of electrical engagement. As is usual, a suitable interlocking device may be provided between cylinders 57 and 70 to prevent switch cylinder 70 being rotated to "on" position until operating lever 48 has been returned to, or is in, normal position.

It is to be understood that minor changes in the construction, arrangement, and combination of the several parts of my truck, and particularly in the driving mechanism thereof, may be made and substituted for those herein shown and described without departing from the nature and spirit of my invention.

Having thus described my invention, what I claim and desire to secure by Letters Patent is:

1. In a motor truck, a non-rotatable axle, a body-frame resiliently movable on said axle, wheels journaled for rotation on said axle, a rotatable driving-shaft swingably carried by said body-frame, a driving sprocket-and-chain connection between said wheels and said shaft, and longitudinally adjustable distance-rods adjustably maintaining said shaft in proper operative position relatively to said axle while permitting thereon free resilient movement of said body frame, said distance-rods having pivotal connection at one end with said shaft and at their other end with said resiliently movable body-frame; substantially as described.

2. In a motor truck, a non-rotatable axle, a body-frame resiliently movable on said axle, wheels journaled for rotation on said axle, hangers swingably suspended from said body-frame, a driving shaft carried by and journaled for rotation in said hangers, a driving sprocket-and-chain connection between said wheels and said shaft, a rigid member fixed to and depending from said frame, said member being resiliently movable with said body-frame, and longitudinally adjustable distance-rods for adjustably maintaining said shaft in proper operative position relatively to said axle while permitting thereon free resilient movement of said body-frame and its said rigid member, said distance rods being pivotally connected at one end to said hangers and at their other end directly to said fixed rigid member; substantially as described.

3. In a motor truck, a non-rotatable axle, rigid slotted pedestals resiliently movable on said axle, a body-frame fixed on and resiliently movable with said pedestals, wheels journaled for rotation on said axle, hangers swingably suspended from said body-frame, a driving shaft carried by and journaled for rotation in said hangers, a driving sprocket-and-chain connection between said wheels and said shaft, and longitudinally adjustable distance-rods extending between said hangers and said pedestals for adjustably maintaining said shaft in proper operative position relatively to said axle while permitting thereon free resilient movement of said pedestals and their carried body-frame, said rods being directly pivotally connected at one end to said hangers and at their other end to said pedestals; substantially as described.

4. In a motor truck, a body-frame, a motor swingably suspended from said body-frame, a rotatable driving-shaft also swingably carried by said body-frame, a sprocket-and-chain connection between said shaft and the armature-shaft of said motor, a member fixed on said motor, a collar on said shaft, and an adjustable distance-rod having connection with said shaft and said motor for adjustably maintaining said motor and said shaft in proper operative position relatively to each other, said rod having at one end pivotal connection with said collar and at its other end slidable engagement with said member; substantially as described.

5. In a motor truck, a body-frame, a motor swingably suspended from said body-frame, hangers also swingably suspended from said body-frame, a driving-shaft carried by and journaled for rotation in said hangers, said shaft being provided with a differential, a sprocket-and-chain connection between said differential and the armature-shaft of said motor, a bored member fixed to said motor, a collar loose on said driving-shaft, and a distance-rod for adjustably maintaining said motor and driving-shaft in proper operative position relatively to each other, said rod having pivotal connection at one end with said collar and being slidably adjustable at its other end in said bored member; substantially as described.

In testimony whereof, I have signed my name to this specification, in the presence of two subscribing witnesses.

SANFORD J. BERNHEIMER.

Witnesses:
ARTHUR M. BRANCH,
F. A. ECOFF.